US009465736B2

(12) United States Patent
Foster et al.

(10) Patent No.: US 9,465,736 B2
(45) Date of Patent: Oct. 11, 2016

(54) VERIFICATION OF MANAGEMENT OF REAL STORAGE VIA MULTI-THREADED THRASHERS IN MULTIPLE ADDRESS SPACES

(71) Applicant: International Business Machines Corporation, Armonk, NY (US)

(72) Inventors: Alfred F. Foster, Wappingers Falls, NY (US); Robert Miller, Jr., Poughkeepsie, NY (US); Thomas F. Rankin, Tillson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/090,890

(22) Filed: Apr. 5, 2016

(65) Prior Publication Data
US 2016/0203077 A1    Jul. 14, 2016

Related U.S. Application Data

(63) Continuation of application No. 14/288,979, filed on May 28, 2014.

(51) Int. Cl.
*G06F 3/06* (2006.01)
*G06F 12/08* (2016.01)
*G06F 12/06* (2006.01)

(52) U.S. Cl.
CPC ......... *G06F 12/0623* (2013.01); *G06F 3/0614* (2013.01); *G06F 3/0644* (2013.01); *G06F 3/0683* (2013.01); *G06F 12/08* (2013.01); *G06F 2212/1032* (2013.01); *G06F 2212/50* (2013.01); *G06F 2212/652* (2013.01); *G06F 2212/657* (2013.01)

(58) Field of Classification Search
None
See application file for complete search history.

(56) References Cited

U.S. PATENT DOCUMENTS 5,103,393 A  *  4/1992  Harris .............. G06F 15/17343
709/226
5,159,677 A  *  10/1992  Rubsam .............. G06F 12/109
711/2

(Continued)

*Primary Examiner* — Michael Krofcheck
(74) *Attorney, Agent, or Firm* — Cantor Colburn LLP; William A. Kinnaman, Jr.

(57) ABSTRACT

A method, system, and computer program product to verify management of real storage via multi-threaded thrashers in multiple address spaces are described. The method includes dynamically scaling a number of units of work and a number of address spaces based on a number of available processors and dynamically scaling an amount and page size of storage pages representing virtual storage accessed by each of the number of units of work based on a total available memory. The method also includes obtaining, at each of the units of work, different types of storage frame sizes and attributes, accessing the storage pages corresponding with the respective different types of storage frame sizes and attributes and performing a respective function, and verifying, for each of the units of work performing the respective function, a location of the storage pages and content of the storage pages based on the respective function.

1 Claim, 2 Drawing Sheets

(56) References Cited

U.S. PATENT DOCUMENTS

| | | | | |
|---|---|---|---|---|
| 5,333,319 A | * | 7/1994 | Silen | G06F 9/52 711/203 |
| 5,740,437 A | * | 4/1998 | Greenspan | G06F 9/4881 711/1 |
| 5,838,893 A | * | 11/1998 | Douceur | G06F 12/02 714/6.32 |
| 6,658,522 B1 | | 12/2003 | Martin et al. | |
| 6,671,783 B1 | * | 12/2003 | Sexton | G06F 12/0284 711/147 |
| 6,823,453 B1 | * | 11/2004 | Hagerman | H04L 29/12009 380/211 |
| 8,176,279 B2 | * | 5/2012 | Farrell | G06F 11/0712 711/152 |
| 2006/0179429 A1 | * | 8/2006 | Eggers | G06F 8/458 717/151 |
| 2009/0063806 A1 | * | 3/2009 | Logan | G06F 9/5016 711/173 |
| 2009/0217098 A1 | * | 8/2009 | Farrell | G06F 11/0712 714/37 |

\* cited by examiner

VERIFICATION OF MANAGEMENT OF REAL STORAGE VIA MULTI-THREADED THRASHERS IN MULTIPLE ADDRESS SPACES

This application is a continuation of U.S. application Ser. No. 14/288,979 filed May 28, 2014, the disclosure of which is incorporated by reference herein in its entirety.

BACKGROUND

The present invention relates to memory management, and more specifically, to verification of management of real storage via multi-threaded thrashers in multiple address spaces.

When a processing system such as a multi-processor computing system is first assembled or upgraded, functionality of the computing system, including the management of the real storage by the operating system, must be verified. Multi-threaded refers to multiple threads or sequences of instructions that are managed and scheduled independently by the operating system on one processor or parallel processors. Thrashing is a term used to indicate a scenario in which a computer's virtual memory subsystem is in a constant state of access and exchange of data in storage. Each address space is a range of virtual addresses assigned by the operating system. When the real storage divided over multiple address spaces is large (e.g., over 1 terabyte) and multi-threaded thrashers are accessing the multiple address spaces, a thorough verification may be additionally complicated.

SUMMARY

According to one embodiment of the present invention, a method of verifying management of real storage in a computing system via multi-threaded thrashers in multiple address spaces includes dynamically scaling a number of units of work and a number of address spaces based on a number of available processors, each of the units of work representing a function to be executed and each of the address spaces identifying a contiguous range of virtual addresses; dynamically scaling an amount and page size of storage pages representing virtual storage accessed by each of the units of work based on a total available memory; obtaining, at each of the units of work, different types of storage frame sizes and attributes, real memory, represented by a sum of the virtual storage accessed by each of the units of work, exceeding the real storage; accessing, using each of the units of work, the storage pages corresponding with the respective different types of storage frame sizes and attributes and performing a respective function; and verifying, for each of the units of work performing the respective function, a location of the storage pages and content of the storage pages based on the respective function.

According to another embodiment of the present invention, a system to verify management of real storage in a computing system via multi-threaded thrashers in multiple address spaces includes a memory device configured to store instructions for units of work and a verification program; and two or more processors configured to execute the instructions to dynamically scale the number of units of work and a number of address spaces based on a number of the two or more processors, each of the units of work representing a function to be executed and each of the address spaces identifying a contiguous range of virtual addresses within the real storage, and dynamically scale an amount and page size of storage pages representing virtual storage accessed by each of the units of work based on a total available memory; wherein each of the units of work is configured to obtain different types of storage frame sizes and attributes, real memory, represented by a sum of the virtual storage accessed by each of the units of work, exceeding the real storage, and to access the storage pages corresponding with the respective different types of storage frame sizes and attributes to perform a respective function, and the two or more processors verify, for each of the units of work performing the respective function, a location of the storage pages and content of the storage pages based on the respective function.

According to yet another embodiment of the present invention, a computer program product stores instructions which, when processed by a processor, cause the processor to implement a method of verifying management of real storage in a computing system via multi-threaded thrashers in multiple address spaces. The method includes dynamically scaling a number of units of work and a number of address spaces based on a number of available processors, each of the units of work representing a function to be executed and each of the address spaces identifying a contiguous range of virtual addresses within the real storage; dynamically scaling an amount and page size of storage pages representing virtual storage accessed by each of the units of work based on a total available memory; obtaining, at each of the units of work, different types of storage frame sizes and attributes, real memory, represented by a sum of the virtual storage accessed by each of the units of work, exceeding the real storage; accessing, using each of the units of work, the storage pages corresponding with the respective different types of storage frame sizes and attributes and performing a respective function; and verifying, for each of the units of work performing the respective function, a location of the storage pages and content of the storage pages based on the respective function.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, memory management must be verified to validate a new or upgraded computing system. Embodiments of the systems and methods discussed herein relate to establishing a test condition in which the real storage manager of the operating system must perform paging to auxiliary storage and verifying the real storage management based on the location and content of stored data. The embodiments specifically relate to multiple threads and multiple address spaces and may be particularly useful in a large (e.g., 1 terabyte) real storage environment.

Figure 1:
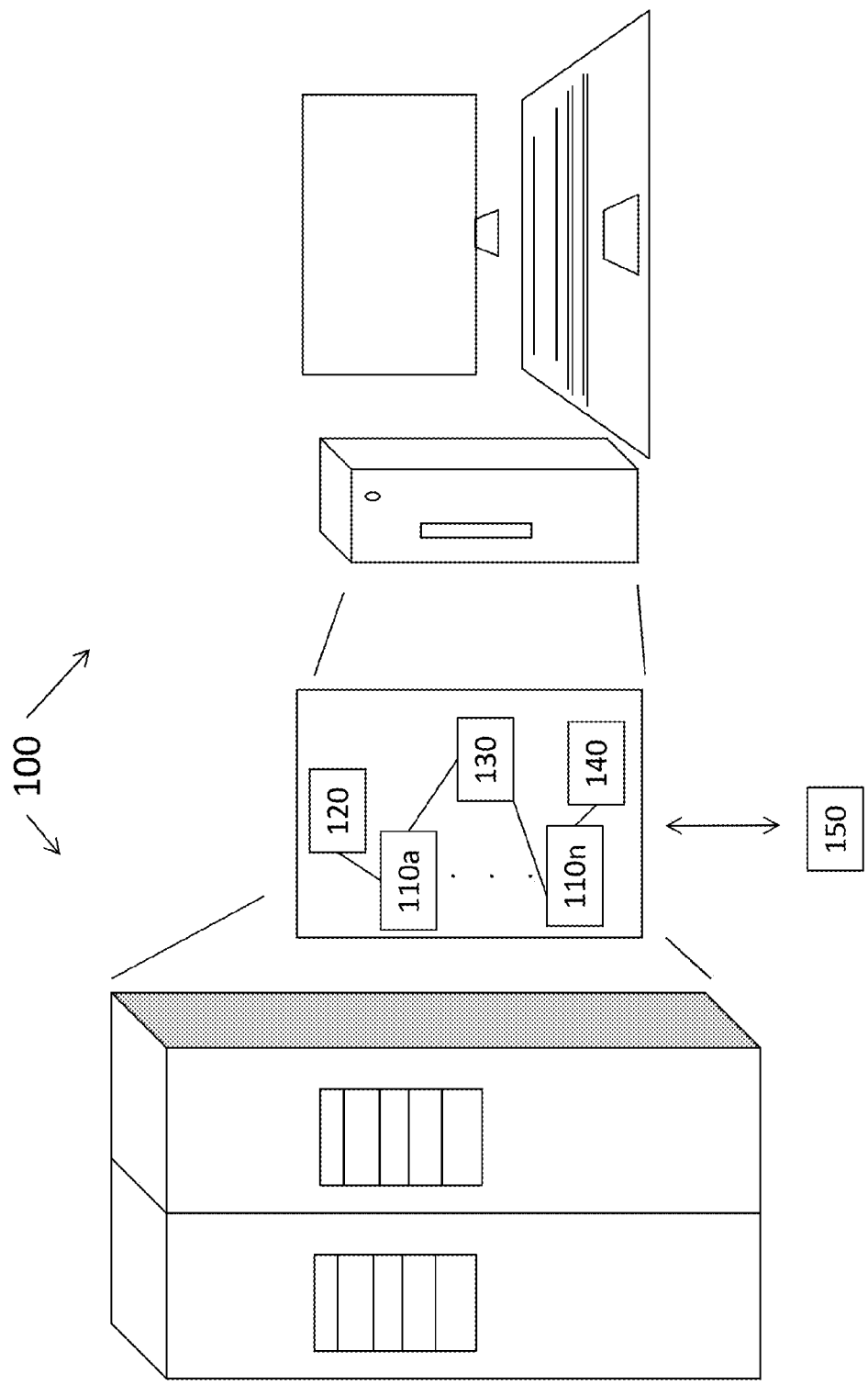
FIG. 1 illustrates multi-processor computing systems that may be verified according to embodiments of the invention.

FIG. 1 illustrates multi-processor computing systems 100 that may be verified according to embodiments of the invention. The multi-processor computing system 100 may be a mainframe or a desktop computer as shown in FIG. 1, for example. The multi-processor computing system 100 includes two or more processors 110a through 110n (generally designated as 110), an input interface 120, one or more memory devices 130 that make up the real memory of the multi-processor computing system 100, and an output interface 140. Memory management by the operating system of the multi-processor computing system 100 is verified based on instructions (detailed below) that are executed by the processors 110. An external device 150 may be in communication with the multi-processor computing system 100. The external device 150 includes an input port, one or more processors, one or more memory devices, and an output port. The external device 150 may play a part in instructing the multi-processor computing system 100 to implement the verification process or may be used in the validation.

Figure 2:
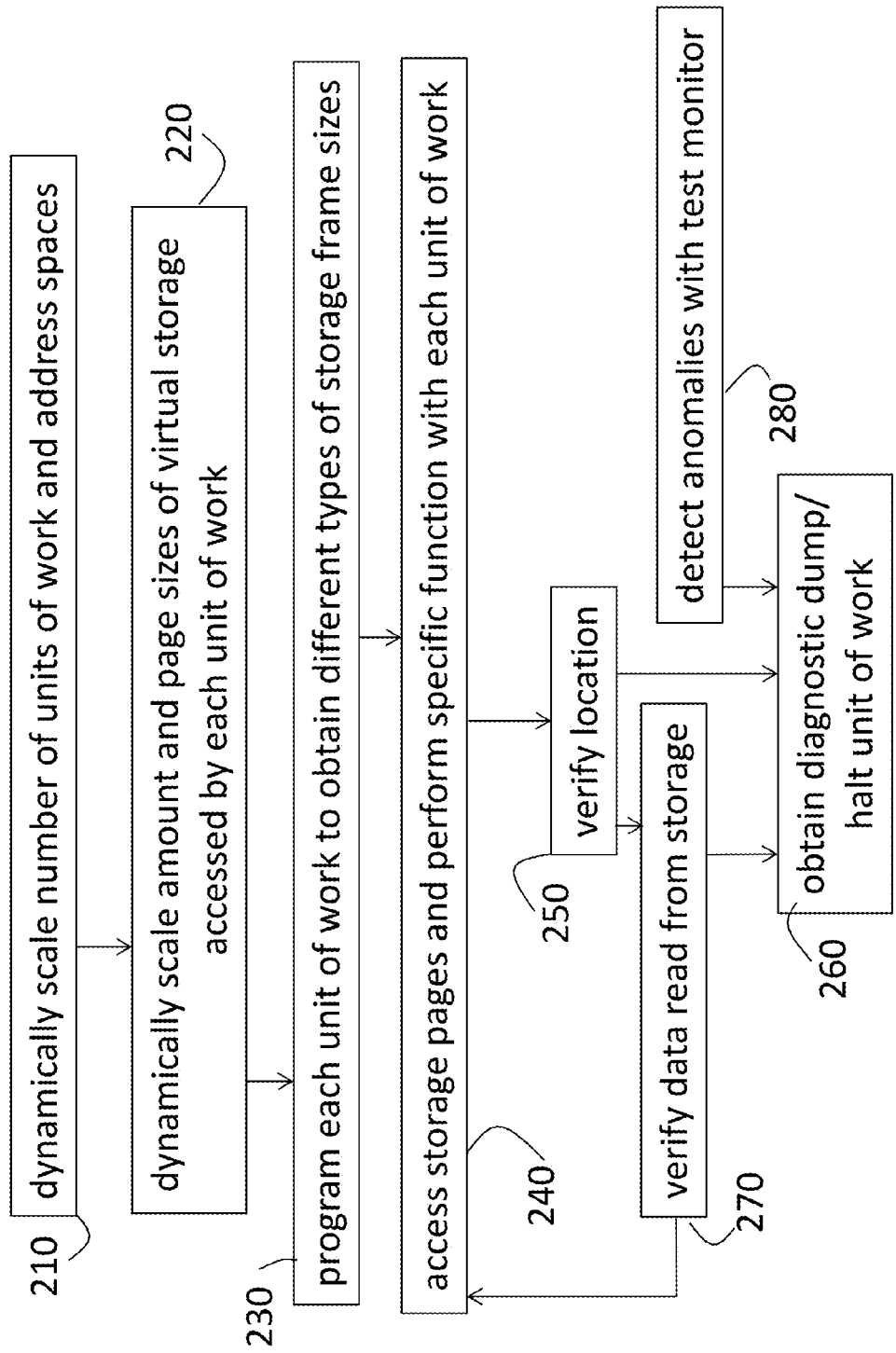
FIG. 2 is a process flow of a method of verifying management of real storage accessed by a plurality of threads in a plurality of address spaces according to embodiments of the invention.

FIG. 2 is a process flow of a method of verifying management of real storage accessed by a plurality of threads in a plurality of address spaces according to embodiments of the invention. While each thread relates to a schedule, a unit of work relates to a function. A unit of work may relate to multiple threads or multiple threads may relate to a given unit of work. According to embodiments discussed herein, multiple units of work are implemented to verify the memory management. At block 210, dynamically scaling the number of units of work and the address spaces includes dividing the units of work among the available processors 110 and the memory spaces among the units of work. At block 220, dynamically scaling the amount and pages sizes (where a page is a unit of virtual memory) of virtual storage accessed by each unit of work is based on the total memory. That is, a sum of the total amount of real storage, total amount of direct access storage device (DASD) auxiliary storage, and total amount of storage class memory (Flash) auxiliary storage is divided by the number of units of work:

$$\frac{real\_storage + DASD + Flash}{number of units of work} \quad [EQ. 1]$$

The dynamically scaling at block 220 is done such that the total amount of virtual storage accessed requires the operating system to move some of the data backed in real memory to auxiliary (DASD and Flash) storage. By having the total amount of virtual storage accessed exceed the total amount of real storage, the management of real storage involving the operating system moving some data from real storage to auxiliary storage and vice versa may be verified. At block 230, programming each unit of work includes each unit of work accessing virtual storage ranges for data that is located in different types of storage frame sizes and attributes (where frames are subsets of real memory). The different frame sizes and attributes include for example, 4 kilobytes (KB) disabled reference (dref), 4 KB pageable, 1 mega byte (MB) fixed, 1 MB pageable, and 2 gigabytes (GB) fixed storage frames. Storage frames (or page frames) relate to real memory rather than virtual memory like pages. The units of work obtain enough virtual storage (memory represented by the sum of the virtual storage ranges) to overcommit the memory (exceed real memory (130) which may be, for example, 1 terabyte (TB)). This forces the real storage manager of the operating system to perform paging to auxiliary storage for private, common, and shared virtual pages so that the memory management may be fully tested.

The processes at blocks 240 through 270 are implemented iteratively as indicated by FIG. 2. The iterations may be of a specified number or the processes may be repeated iteratively for the duration that the computing system 100 is available for test. At block 240, accessing storage pages and performing a specific function with each unit of work includes the storage range (memory address range within the corresponding memory address space) used by each unit of work corresponding with the current iteration. The function performed by a given unit of work may include writing to the storage area, reading and verifying the storage area, paging the storage area out to auxiliary storage, paging the storage area in from auxiliary storage, or freeing and re-obtaining a new storage area. The functions performed in parallel by each unit of work (by the corresponding processor) result in frequent access of memory. Thus, the multi-processor computing system 100 under test may be thought of as implementing multi-threaded thrashers. At block 250, verifying the location includes checking the expected storage area based on the function performed by each unit of work. For example, the function may have required that data be backed in real storage with 4 KB, 1 MB, 2 GB dref, pageable, or fixed frames or that data be paged-out on DASD or flash storage. The verification itself may be performed using operating system services such as internal system services. When verifying at block 250 indicates that data is not located at the expected location, the process at block 260 of obtaining a diagnostic dump may be performed. The process at block 260 may also include halting the unit of work resulting in the incorrect location. When the correct location is detected at block 250 (data is located at the expected location), verifying any data read from storage at block 270 may be done using a unique key composed of the frame address location, a sequence number, and a stored clock time. The verification (blocks 250 and 270) following execution of test functions by the units of work facilitates deterministic validation of the operating system. At block 280, additional verification may be performed by detecting anomalies with a test monitor. The test monitor may use internal or external counts maintained by the operating system to verify that the operating system properly manages usage of 4 KB, 1 MB, and 2 GB pages, for example, for a large amount of real storage (e.g., 1 TB). The test monitor may be implemented in the external device 150, for example. Based on the outcome of verifying the data at block 270 or the additional verification at block 280, obtaining a diagnostic dump and, additionally, halting of the corresponding unit of work may be done at block 260.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of verifying management of real storage in a computing system via multi-threaded thrashers in multiple address spaces, the method comprising:

dynamically scaling a number of units of work and a number of address spaces based on a number of available processors, each of the units of work representing a respective function to be executed and each of the address spaces identifying a contiguous range of virtual addresses, the dynamically scaling the number of units of work including assigning each of the units of work to a respective one of the available processors;

dynamically scaling an amount and page size of storage pages representing virtual storage accessed by each of the units of work based on a total available memory, the dynamically scaling the amount and page sizes of virtual storage including determining the total available memory as a sum of total amount of real storage, total amount of direct access storage device (DASD) auxiliary storage, and total amount of storage class memory (Flash) auxiliary storage;

obtaining, at each of the units of work using the respective one of the available processors in parallel, a range of the virtual storage located in different types of storage frame sizes and attributes, a storage frame being a subset of the real storage, and real memory, represented by a sum of the range of the virtual storage accessed by each of the units of work, exceeding the real storage;

accessing, using each of the units of work, the storage pages corresponding with the respective different types of storage frame sizes and attributes to perform the respective function; and verifying, for each of the units of work performing the respective function, a location of the storage pages and content of the storage pages based on the respective function to perform deterministic validation, wherein the verifying the content of the storage pages includes using a unique key composed of a corresponding frame address of the location, a sequence number, and a stored clock time.

* * * * *